APPARATUS FOR PREVENTING UNINTENTIONAL BENDING OR JACKKNIFING AND FOR IMPROVING LATERAL TRAVELLING STABILITY IN AN ARTICULATED VEHICLE

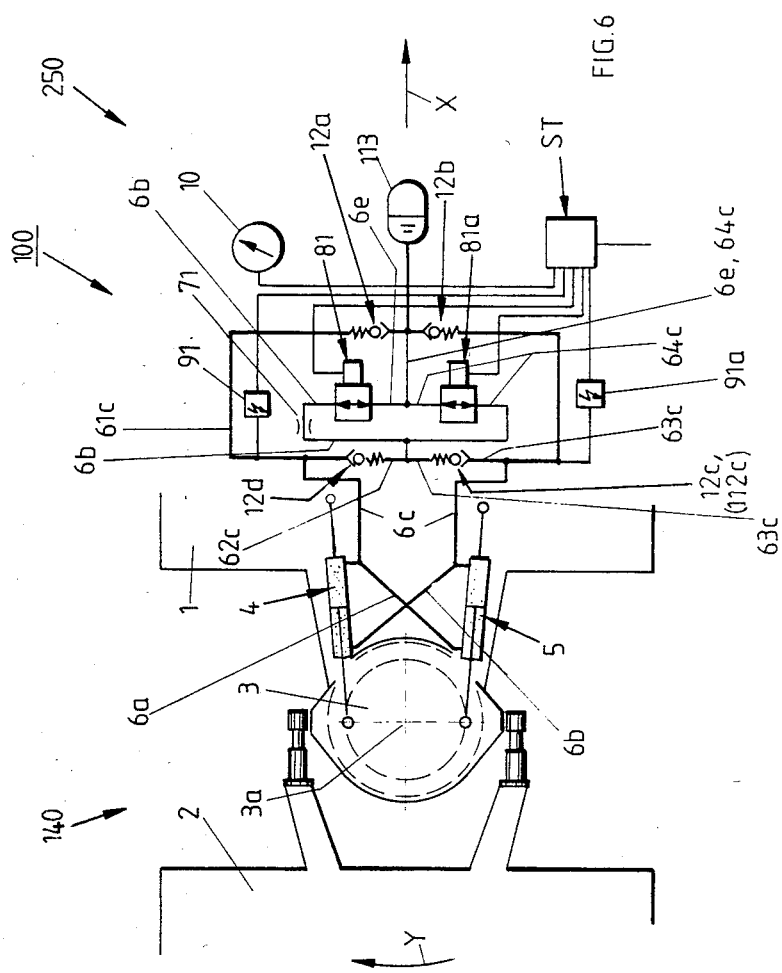

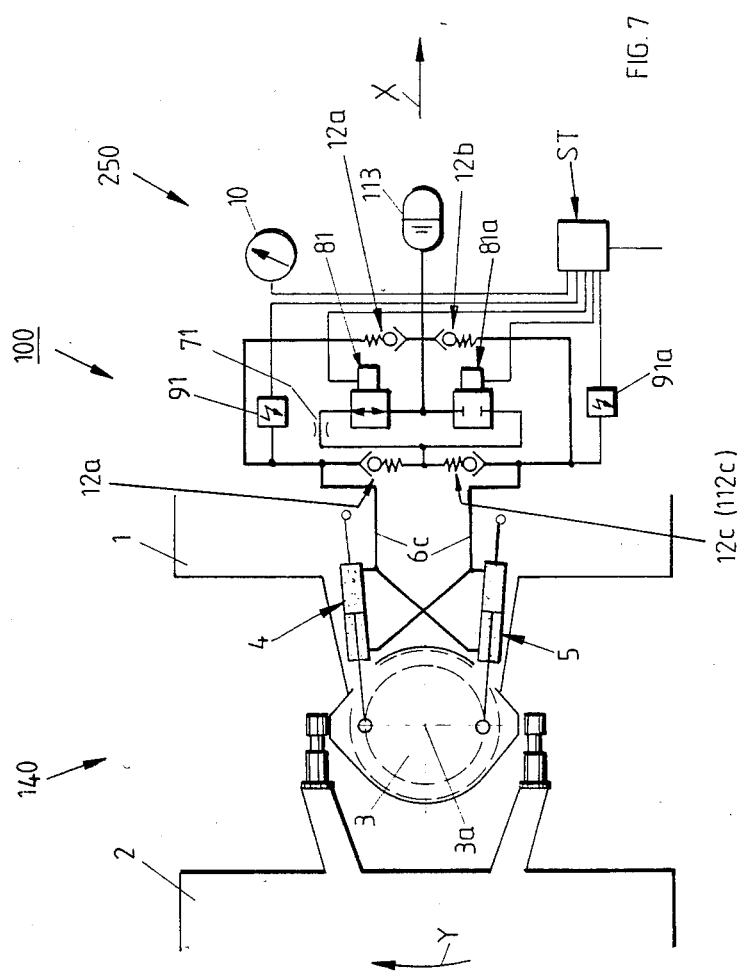

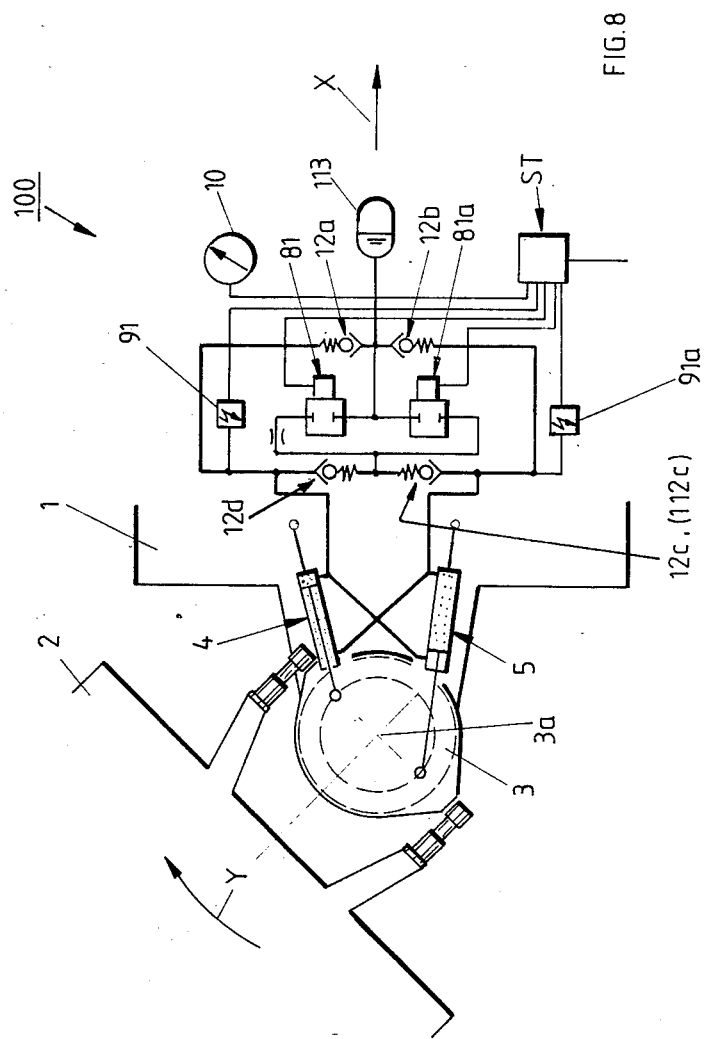

BACKGROUND OF THE INVENTION

The invention relates to an apparatus for preventing unintentional bending in or jackknifing and for improving the lateral travelling stability under critical road and travelling conditions, which is located in the fulcrum area of an articulated vehicle comprising a front vehicle part and a rear vehicle part connected in articulated manner thereto, one of the two vehicle parts being motor-driven and suitable for semitrailers, articulated buses or vehicles having a towed vehicle part.

Articulated vehicles, such as e.g. semitrailers, comprise a towing vehicle and a following trailer pivotably coupled thereto. This towed part carries the load and transfers its mass by means of one or more axles directly to the road and indirectly and proportionately via the axles of the towing vehicle or front vehicle.

As a result of the articulated connection, the vehicle is sensitive with regards to its lateral travelling stability. In the case of semitrailers, the ratio of the towing vehicle wheel base to dimension from the supporting fulcrum to the centre of the rear axle unit is generally approximately 1:2. However, as a result of the design, the mass centre is relatively high and is located between the towing vehicle rear axle and the rear axle unit of the towed vehicle. During acceleration and deceleration when travelling, this can lead to an unstable behaviour of the overall vehicle. The frictional connection between the wheels and the road is of considerable significance, particularly if there are large adhesion differences between the different wheels or axles. As a function of the travelling speed, there is a danger of horizontal, undesired jackknifing of the articulated vehicle on braking or swerving of the semitrailer.

Under normal frictional connection conditions, the travelling pattern on a horizontal plane leads to clearly defined relationships between the steering lock of the front axle and the jackknifing angle of the semitrailer at its supporting fulcrum, which also leads to the curving of the vehicle. However, with increasing speed, the permitted steering lock on the front axle must be kept smaller for safety reasons, leading to the associated angle at the fulcrum of the semitrailer.

An articulated vehicle, such as e.g. a semitrailer, can jackknife for the following reasons:
different adhesion forces in the travelling pattern and mass forces,
at excessive speed, mass forces via a lever action,
skidding in the case of inadequate transverse adhesion.

SUMMARY OF THE INVENTION

The problem of the present invention is therefore to provide an apparatus for articulated vehicles, which prevents oversteering and uncontrolled swinging of the rear vehicle part of an articulated vehicle comprising two vehicle parts, interconnected by a pivot joint and which leads to an increase in the jackknifing security and lateral stability of such articulated vehicles. In addition, an apparatus is to be provided for articulated vehicles, whose blocking action occurs independently of the reaction of the driver and the particular travelling conditions, which does not permit the extension of the articulated vehicle after blocking has occurred, which has no negative repercussions on the travelling behaviour and in which the momentum for the initiation of a joint blocking is only dependent on the measured quantity and feedback variable.

According to the invention, this problem is solved by an apparatus of the aforementioned type, wherein the apparatus comprises a supporting device connecting the two vehicle parts pivotably coupled together by means of a pivot joint and which comprises hydraulic cylinder units terminally articulated to one of the two vehicle parts and with its opposite ends articulated in each case to the right or left of a joint central axis to the in each case other vehicle parts at a distance from said central axis and which in each case have two liquid chambers separted by a plunger piston fixed to a piston rod, two liquid chambers being interconnected in each case by means of connection lines that in the case of a horizontal rotary movement of the vehicle parts towards one another, there is always a connection between the chambers increasing in volume and the chambers decreasing in volume corresponding to the movement of the plunger piston and a flow limiting device having a connecting line connecting the aforementioned connecting lines.

Such an apparatus makes it possible to give the momentum for initiating joint blocking solely by means of an electrical pushbutton switch the apparatus serving both as a measuring and as a regulating device for preventing and damping jackknifing and for improving the lateral travelling stability of an articulated vehicle. Thus, jackknifing can no longer take place and under critical driving conditions, such a driving state will immediately be measuring-technically determined and simultaneously the necessary security against jackknifing is ensured.

As a further solution of the problem of the invention, an apparatus for articulated vehicles is proposed, wherein the apparatus comprises a supporting device connecting the two vehicle parts pivotably coupled together by means of a pivot joint and which comprises a hydraulic cylinder unit terminally articulated to one of the two vehicle parts and whose other end is articulated to the other vehicle part at a distance from the joint central axis and has two liquid chambers separated by a plunger piston fixed to a piston rod, and a flow limiting device having a connecting line connecting the liquid chambers.

An apparatus constructed in this way is preferably used where only a single hydraulic cylinder unit can be employed, due to limited volume or moving volume conditions.

According to a preferred embodiment, the flow limiting device comprises a connecting line, in whose flow area are arranged at least one pressure regulating valve, at least one regulatable valve, at least two pressure measuring devices connected to the connecting line and in each case arranged in front of or behind the regulatable valve, a hydraulic accumulator and a control means.

Such a flow limiting device makes it possible to construct a complete measuring and regulating device for joint blocking or vibration damping, whilst using a small number of components.

According to another preferred embodiment the flow limiting device comprises a connecting line, having a section with two check valves blocking in opposite flow directions and between which issues a supply line, which are connected with the connecting line in front of and behind said section by means of supply lines, in whose flow course are provided corresponding blocking check valves, and whereby before it issues into the section, in its flow course are arranged a pressure measuring switch, a pressure regulating valve, a regulatable valve and a hydraulic accumulator.

As a result of this construction of the flow limiting device and whilst using only very simple and operationally reliable components, a suitable measuring and regulating device is formed within the apparatus for preventing jackknifing and for improving the lateral travelling stability.

Further advantageous developments of the invention can be gathered from the subclaims.

BRIEF DESCRIPTION OF THE DRAWINGS

The invention is described in greater detail hereinafter relative to non-limitative embodiments and the attached drawings, wherein show:

FIG. 6 a jackknifing angle regulating and limiting device in a release operating position.

FIG. 7 the apparatus of FIG. 6 in a regulating operating position.

FIG. 8 the apparatus of FIG. 6 in a blocking operating position.

DETAILED DESCRIPTION OF THE PREFERRED EMBODIMENTS

Figure 1:
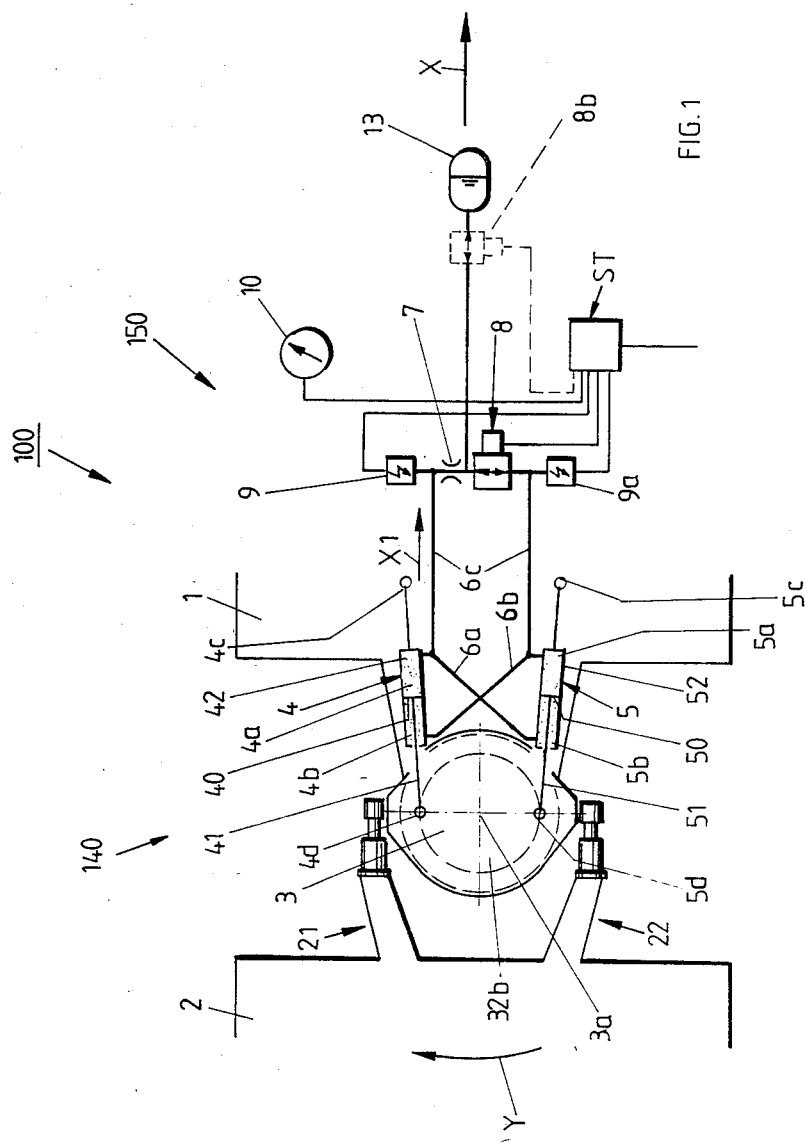
FIG. 1 a jackknifing angle regulating and limiting device in a diagrammatic system view from above.
Figure 2:
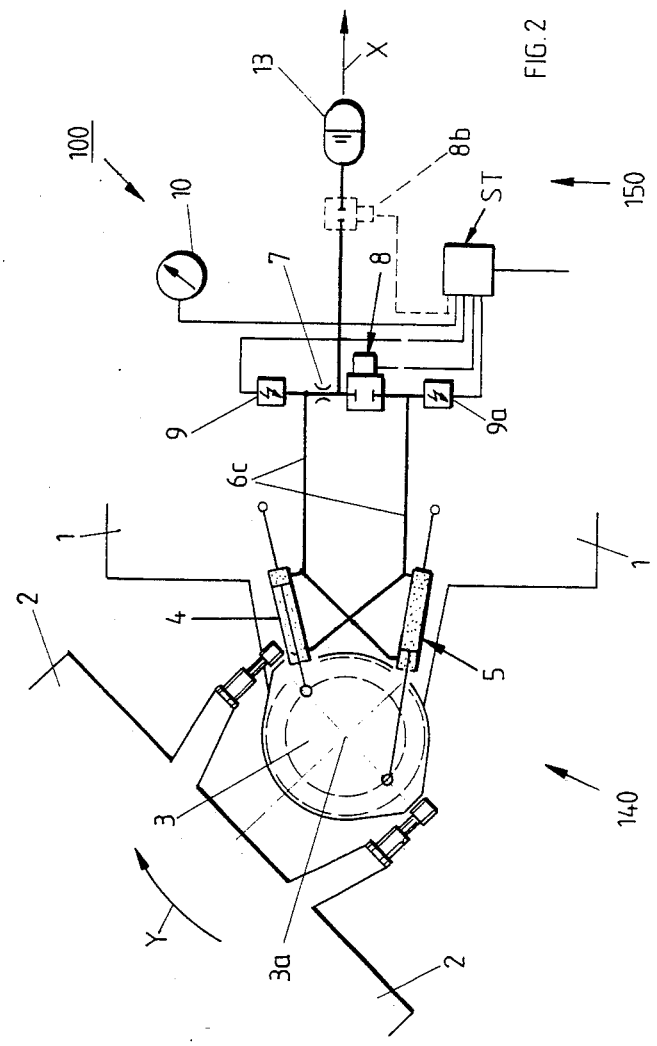
FIG. 2 the apparatus of FIG. 1 in a joint-blocking operating position.

FIGS. 1 and 2 show the jackknifing angle regulating and limiting apparatus 100, which comprises supporting device 140 and the flow limiting device 150. Apparatus 100 is shown in a purely diagrammatic manner on a pivot joint 3 connecting two vehicle parts 1, 2, but it is also possible to use any other joint bringing about the same operation and kinematics. The vehicle comprises a front vehicle part 1 and a rear, e.g. motor-driven vehicle part 2, the two vehicle parts 1, 2 being so connected by pivot joint 3 that the necessary freedom of movement in three planes for a connection of such articulated vehicles is ensured, namely a turning of the vehicle parts with respect to one another about the vertical axis, a bending in of the vehicle parts in the longitudinal vehicle direction in the joint region and an elastic rotatability in the joint.

The supporting device 140 is correspondingly arranged in the vicinity of the pivot joint of the two vehicle parts 1, 2 and comprises two hydraulic cylinder units 4, 5. The two units 4, 5 have two liquid chambers 4a, 4b, 5a, 5b separated by a plunger piston 40, 50 fixed to a piston rod 41, 51 and their front end 4d, 5d in the vicinity of pivot joint 3 is arranged on yoke plate 32b, at a distance from the central axis 3a of the joint and which is connected by members 21, 22 to vehicle part 2. The opposite ends 4c, 5c of hydraulic cylinder units 4, 5 are correspondingly articulated to the other vehicle part 1, each articulated suspension 4c, 4d, 5c, 5d being constructed in such a way that the hydraulic cylinder units do not offer unintentional resistance to the movement of the vehicle parts towards one another and the joint movement during a simultaneous movement of the plunger pistons 40, 50 fixed to piston rods 41, 51 within casing 42, 52 of hydraulic cylinder units 4, 5.

In the casing 42, 52 of each cylinder unit 4, 5, by means of plunger pistons 40, 50 separate liquid chambers 4a, 4b, 5a, 5b are formed, whereby in each case two chambers 4a, 4b, 5a, 5b are so interconnected by connection lines 6a, 6b that in the case of a horizontal rotary movement of the vehicle parts 1, 2 towards one another, the chambers 4a, 5b whose volume decreases and chambers 4b, 5a whose volume increases are in each case connected corresponding to the movement of pistons 40, 50. Liquid chambers 4a, 4b, 5a, 5b, like connection lines 6a, 6b, are completely filled with a suitable incompressible hydraulic fluid, such as e.g. hydraulic oil, so that by a movement of the plunger pistons, there must be a liquid exchange between connection lines 6a, 6b. On pivoting vehicle part 2 in rotation direction Y about the central axis 3a of the joint, corresponding to the movement of plunger pistons 40, 50 and the volume-decreasing chambers 4a, 5b or the volume-increasing chambers 4b, 5a, liquid must be passed from connection line 6a into connection line 6b. To this end, connection line 6c is provided between connection line 6a, 6b and line 6c can be connected to any random point of connection line 6a or connection line 6b.

Within connection 6c is arranged the flow limiting device 150, which comprises a pressure measuring device 9, a pressure regulating valve 7, a regulatable valve 8, optionally a hydraulic accumulator 13, a further pressure measuring device 9a and a control means ST, the latter being connected with all the members 7, 8, 9, 9a of device 150 by means of corresponding electrical leads. Control means ST is also connected to a corresponding tachometer 10.

The operation of the flow limiting device is illustrated in FIGS. 1 and 2. In the case of the aforementioned rotary movement of vehicle part 2 with respect to vehicle part 1 about joint central axis 3a in the rotation direction Y, there is a liquid flow in connection line 6c in the direction of arrow X1. This liquid flow successively flows through the pressure regulating valve 7 and the regulatable valve 8, and before flowing through valve 7 it activates pressure measuring device 9 or, after flowing out of valve 8, pressure measuring device 9a. In the operating position of regulatable valve 8 symbolically represented in FIG. 1, the liquid flow flows in unimpeded manner through valve 8, so that there can be a free liquid exchange between liquid chambers 4a, 5b and liquid chambers 4b, 5a, the volume difference flow being taken up by hydraulic accumulator 13.

The hydraulic liquid flow flowing through line 6c is under a certain pressure, because the free flow through pressure regulating valve 7 is impeded. As the compensation between liquid chambers 4a, 4b, 5a, 5b via connection lines 6a, 6b, 6c is proportional to the rotary movement of vehicle part 2 with respect to vehicle part 1, the speed of liquid flow in connection line 6c is directly proportional to the rotary speed of vehicle part 2 about joint central axis 3a. As the pressure in connection line 6c is also in relation to the flow speed of the liquid through connection line 6c, the possibility arises of using the pressure in connection line 6c directly as a test signal for the rotary speed about central axis 3a. This pressure is in each case recorded by the pressure devices 9, 9a, which supply a corresponding test signal to control means ST.

If vehicle part 2 now effects a very rapid rotary movement relative to vehicle part 1, the pressure in the connection line 6c rises very strongly in front of pressure regulating valve 7. For example, such a pressure rise occurs if the motor-driven vehicle part 2, when there is no transverse adhesion, undesirably outwardly displaces the central axle (not shown in the drawing) of vehicle 1, 2 beyond its fulcrum 3a or if there are violent skidding movements of vehicle part 2, so that the hydraulic medium is forced under high pressure through pressure regulating valve 7.

If the pressure measured by the pressure measuring devices 9, 9a exceeds a value predetermined in control means ST, regulatable valve 8 is put into operation, i.e. it reduces its cross-section. As a result, the reciprocal rotary movement of the vehicle parts is reduced or completely blocked, if valves 8, 8b close completely. If valve 8 closes, e.g. in the case of a rotary movement in direction Y, the hydraulic medium can no longer flow out of liquid chambers 4a, 5b into liquid chambers 4b, 5a and then joint 3 of vehicle 1, 2 is blocked with respect to its rotary movement. This blocking of the joint is maintained by means of control means ST until the pressure measured by pressure measuring device 9 or 9a drops, because such a pressure drop indicates that e.g. the skidding movements of vehicle part 2 have been absorbed, or that the transverse adhesion of the vehicle has been restored. The blocking position of valve 8 shown in FIG. 2 is then removed again and by the articulated vehicle travelling in direction X, said vehicle is again brought into a straight position with regards to its vehicle parts 1, 2.

The limit value given by control means ST and measured by pressure measuring devices 9, 9a is given by control means ST as a function of the travelling speed passed to means ST by tachometer 10. On the basis of the speed supplied by tachometer 10, control means ST calculates by means of a suitable programme circuit, the pressure values at which regulatable valve 8 reduces its cross-section, or completely closes the latter. Control means ST can also store constant, vehicle-specific pressure limits.

Figure 3:
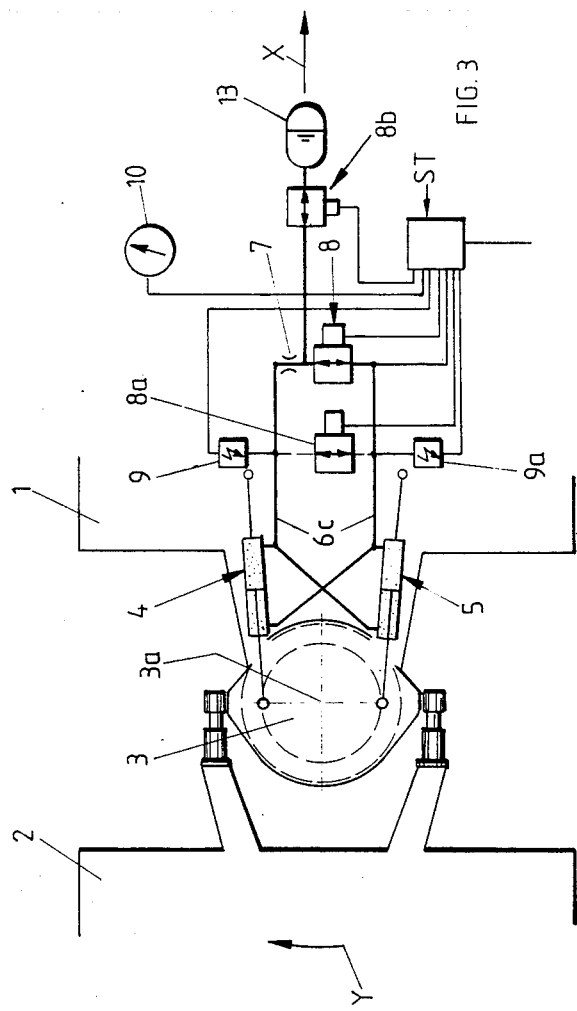
FIG. 3 a jackknifing angle regulating and limiting apparatus in another embodiment in a release operating position in a diagrammatic system view from above.
Figure 4:
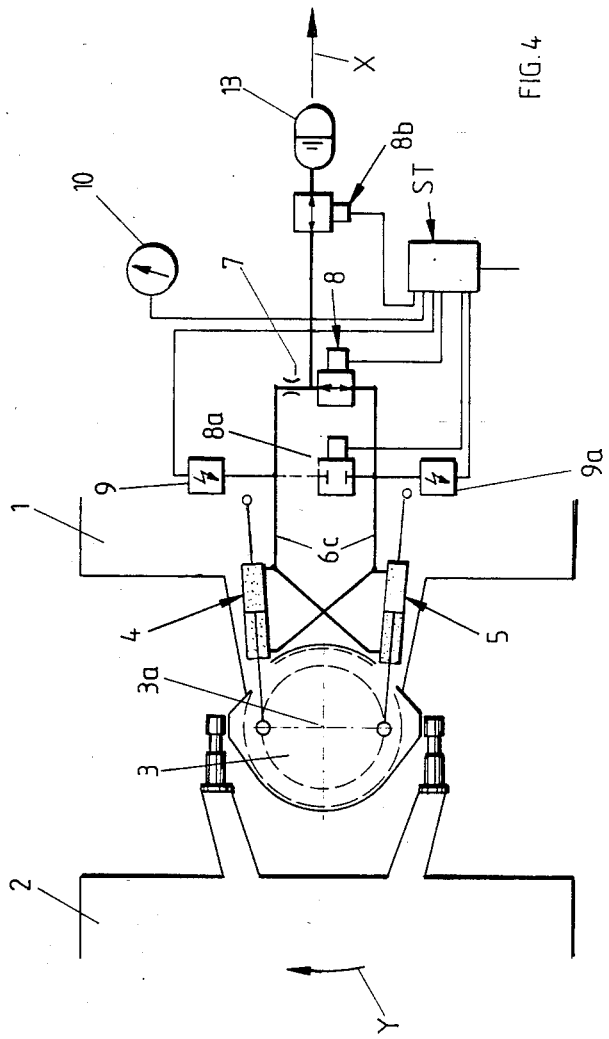
FIG. 4 the apparatus of FIG. 3 in a regulating operating position.
Figure 5:
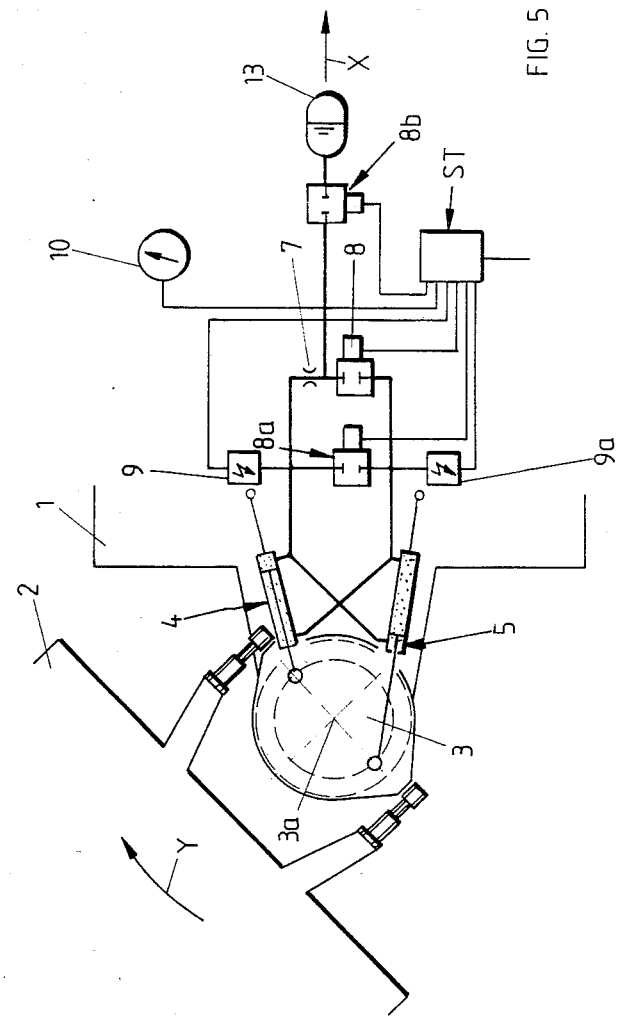
FIG. 5 the apparatus of FIG. 3 in a blocking operating position.

FIG. 3 shows another embodiment of the apparatus in which a further valve 8a is arranged within connection line 6c parallel to valve 8. Valve 8a permits an unimpeded parking of such an articulated vehicle, because it is when parking that there is a rapid rotary movement about the central axis 3a of the joint of vehicles 1, 2. The operation of valves 8 and 8a is shown in FIGS. 3 to 5. When the articulated vehicle is travelling slowly, valve 8 is open. Valve 8a controlled by control means ST as a function of the travelling speed determined by tachometer 10 opens with falling speed and consequently makes pressure regulating valve 7 inoperative. In this way, the complete cross-section of valve 8a and consequently connection line 6c is opened, so as to permit unimpeded parking of the vehicle and consequently a reciprocal rotary movement of vehicle parts 1, 2.

When travelling straight ahead and at increasing speed, valve 8a is closed by means of control means ST. As valve 8 remains open, pressure regulating valve 7 remains active, it also being possible to arrange such valves 7 in connection line 6c. Thus, the liquid exchange between the corresponding liquid chambers 4a, 4b, 5a, 5b of hydraulic cylinder units 4, 5 is reduced and in addition any reciprocal oscillating movements of the vehicle parts with respect to one another are damped. In FIG. 3, both valves 8, 8a are opened, whereas in FIG. 4 valve 8 is open and valve 8a is closed, whilst in FIG. 5 both valves 8, 8a are closed. In the operating position of the flow limiting device 150 shown in FIG. 5, apparatus 100 is in its position blocking joint 3, because there can be no liquid change in this position between liquid chambers 4a, 4b, 5a, 5b via connection lines 6a, 6b, 6c.

The pressure rise caused by the different volumes of the individual liquid chambers and independently of the speed of the liquid change between the individual chambers, is taken up by a hydraulic accumulator 13 connected to connection line 6c. This is particularly necessary through the fact that the particular liquid chambers 4a, 4b, 5a, 5b of a hydraulic cylinder unit 4, 5 have different volume changes in the case of a movement of plunger pistons 40, 50 because piston rod 41, 51 is in each case arranged in one chamber.

In the embodiment of the jackknifing angle regulating and limiting device shown in FIGS. 6 to 8, the apparatus comprises supporting device 140 and the flow limiting device 250. Supporting device 140 is constructed in the manner described hereinbefore.

The flow limiting device 250, whose operation with respect to supporting device 140 is the same as that with respect to flow limiting device 150, comprises check valves 12a, 12b, 12c, 12d, two pressure measuring switches 91, 91a, a pressure regulating valve 71, a regulatable valve 81 and a hydraulic accumulator 113, which are appropriately arranged in connection lines 6c, 6e, 61c, 62c, 63c in the manner indicated hereinafter. Connection line 6c has a section 61c, in which are arranged two oppositely blocking check valves 12a 12b and two pressure measuring switches 91, 91a, between which issues a supply line 6e, which is connected via supply line 62c, 63c to connection line 6c in front of or behind section 61c. Supply line 62c having a check valve 12d in its flow course and supply line 63c having a check valve 12c in its flow course are joined to supply line 6e, which contains a pressure regulating valve 71, a regulatable valve 81 and a hydraulic accumulator 113. To facilitate the parking of an articulated vehicle and slow movements with a strong steering lock, supply line 63c is connected via a connection line 64c with the section 61c of connection line 6c in the opening area of supply line 6e, the flow path of connection line 64c containing a correspondingly arranged check valve 112c and a further regulatable valve 81a.

The operation of the flow limiting device 250 will initially be described relative to FIG. 6. In the case of a rotary movement of vehicle part 2 relative to vehicle part 1 about joint central axis 3a in the direction of arrow Y, via connection lines 6a, 6b, 6c, there is a corresponding, aforementioned exchange of hydraulic liquid between the volume-increasing or volume-decreasing liquid chambers 4a, 4b, 5a, 5b, the exchanging hydraulic liquid flowing via connection line 6c. With the given rotary movement of vehicle part 2, the hydraulic flow, as a result of the blocking or release actions of the different check valves 12a, 12b, 12c, 12d, flows from connection line 6a, via connection line 6c and supply line 62c into supply line 6e, in whose flow path are arranged pressure regulating valves 71, regulatable valve 81 and hydraulic accumulator 113. After flowing through supply line 6e, the hydraulic liquid is returned via a further part of line 61c and connection line 6c into connection line 6b and into hydraulic cylinder units 4, 5. In the release or open operating position of regulatable valve 81a shown in FIG. 6, the hydraulic liquid can be introduced directly into line 61c in the corresponding section thereof, parallel to supply line 6e, through connection line 64c, whose flow path contains regulatable valve 81a. Thus, pressure measuring device 91, pressure regulating valve 71 and regulatable valve 81 are not subject to the action of these hydraulic liquids.

In the blocking operating position of valve 81a shown in FIG. 7, then in the case of a corresponding rotary movement on vehicle part 2, the hydraulic liquid is forced through supply line 6e. In this operating position, if the pressure in the hydraulic liquid exceeds the value given by control means ST in front of pressure regulating valve 71, said value being recorded by pressure measuring device 91, the regulatable valve 81 is wholly or partially closed, so that the oscillating or skidding movements of vehicle part 2 are damped or, if joint 3 is blocked, completely prevented. FIG. 8 illustrates the blocking position, brought about by a complete closure of valves 81, 81a. Here again, a hydraulic accumulator 113 can be provided and can be used for taking up the differential liquid flow, which occurs independently of the speed of the rotary movement of vehicle parts 1, 2 relative to one another.

Figure 9:
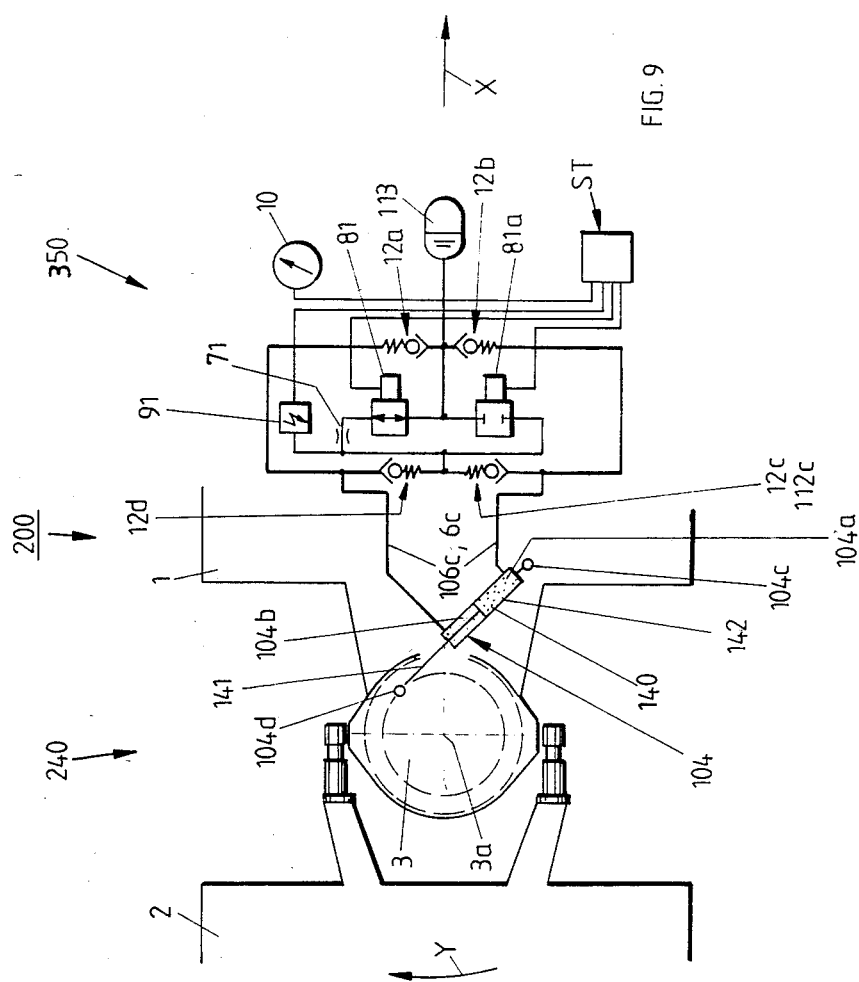
FIG. 9 a jackknifing angle regulating and limiting apparatus in another embodiment in a diagrammatic system view from above.

FIG. 9 shows another embodiment of the jackknifing angle regulating and limiting apparatus 200, which comprises a supporting device 240 and the flow limiting device 350, which only has one pressure measuring device 91.

Supporting device 240 comprises a hydraulic cylinder unit 104 fixed by one end 104c to vehicle part 1 and by its opposite end 104d to the other vehicle part at a distance from joint central axis 3a. In the casing 142 of unit 104 are formed two liquid chambers 104a, 104b separated by a plunger piston 140 fixed to a piston rod 141. Liquid chambers 104a, 104b are connected by a connection line 106c, in which is arranged the flow limiting device 350, whose operation is the same as that of the previously described device 250.

The construction of supporting device 240 also permits an arrangement of a jackknifing angle regulating and limiting apparatus in the case of articulated vehicles, in which there is only a limited space available for such an apparatus in the vicinity of the joint connecting the two vehicle parts. However, if the supporting device 240 is appropriately constructed and has an appropriate strength, it is also possible to use apparatus 200 on heavy articulated vehicles, such as semitrailers, articulated buses, or vehicles having a following, towed, driven vehicle part.

Figure 10:
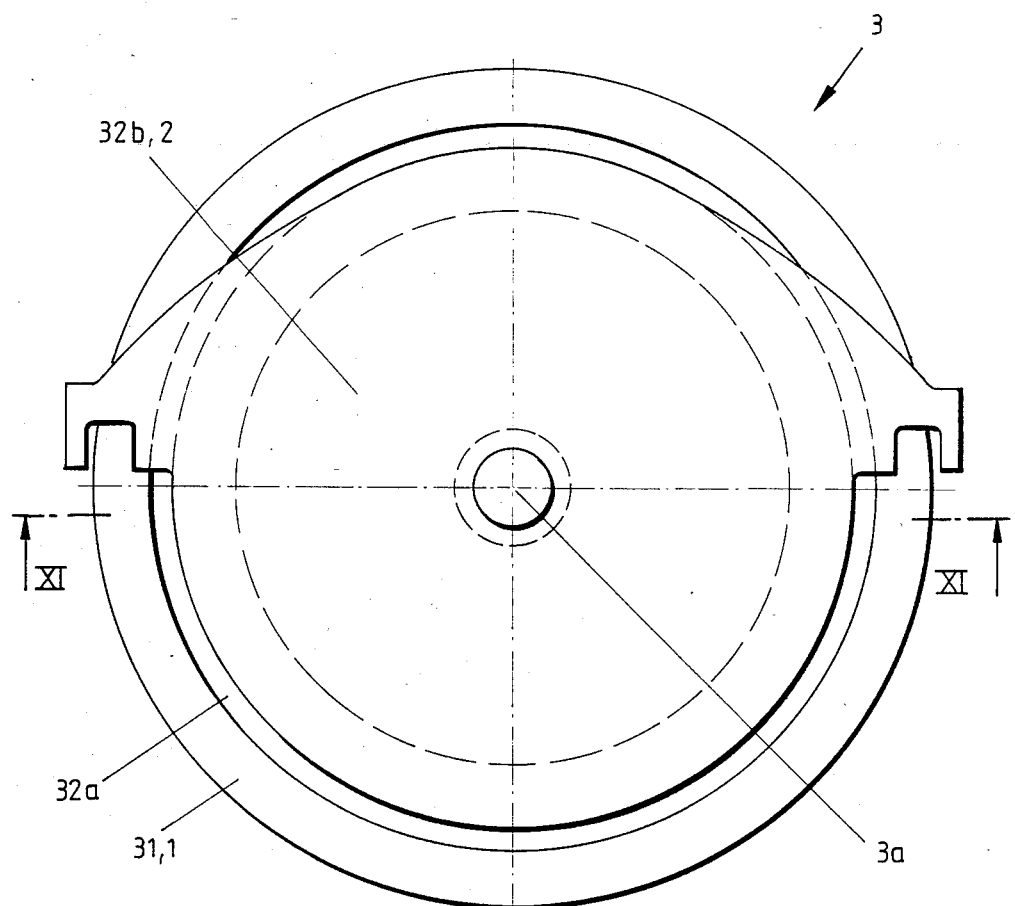
FIG. 10 a diagrammatic plan view of a pivot joint.
Figure 11:
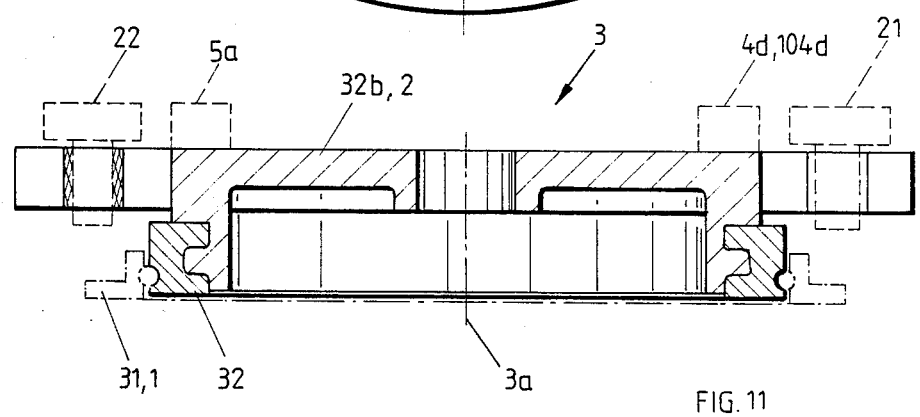
FIG. 11 the pivot joint in a vertical sectional view along line XI—XI of FIG. 10.

FIG. 10 shows a special pivot joint also intended for use as a jackknifing angle regulating and limiting apparatus, but it is also possible to use any other joint fulfilling the requirements made on pivot joints in the case of articulated vehicles, in connection with the jackknifing angle regulating and limiting apparatus 200, 100, 300, provided that there is a suitable possibility for the articulation of end points 4d, 5d, 104d, 105d of hydraulic means 4, 5, 104. The pivot joint 3 comprises a stationary mounting ring 31 fixed on vehicle part 1 and in which is freely rotatably mounted an inner rim 32a, which carries yoke plate 32b and is fixed thereto. Yoke plate 32b is detachably connected by means of corresponding members 21, 22 to vehicle part 2. End points 4d, 5d, 104d, of hydraulic cylinder units 4, 5, 104 are arranged on yoke plate 32b, as is diagrammatically shown in FIG. 11. Members 21, 22, which engage in yoke plate 32b by means of corresponding elastic bearings, transfer the rotary movement of vehicle part 2 to hydraulic cylinder units 4, 5 via yoke plate 32b, so that a blocking of this rotary movement can be attained, in the case of a blocking action of the jackknifing angle regulating and limiting apparatus. However, if the latter is in its release operating position, the vehicle parts can rotate freely relative to one another, because inner rim 32a is freely rotatable in the stationary mounting ring 31 via a ball turning or rotating joint.

Figure 12:
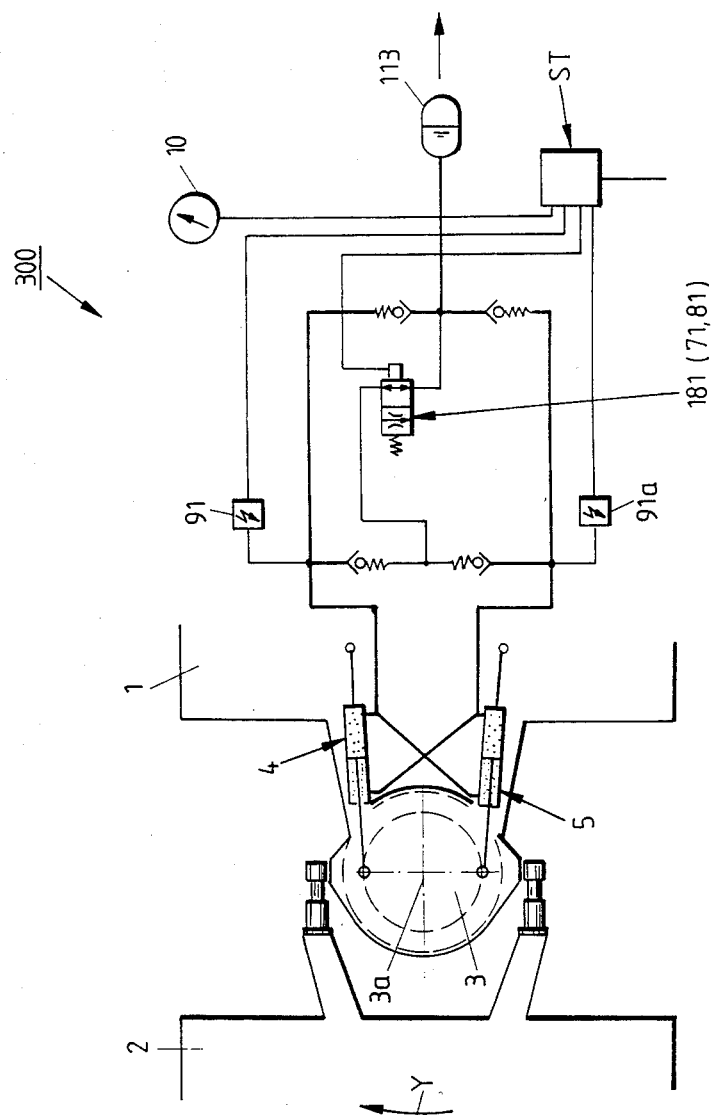
FIG. 12 another embodiment of the jackknifing angle regulating and limiting device in a diagrammatic system view from above.
Figure 13:
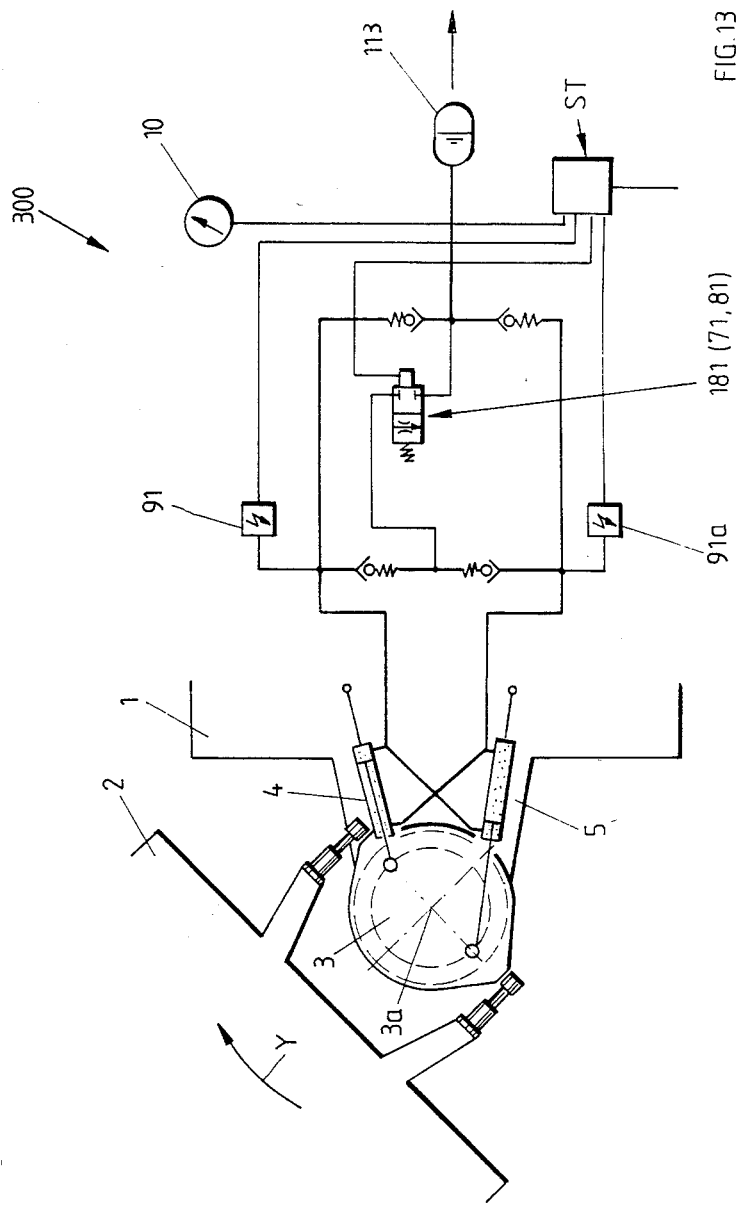
FIG. 13 the apparatus of FIG. 12 in a blocking operating position.

In the further embodiment of the jackknifing angle regulating and limiting apparatus according to FIG. 6 shown in FIGS. 12 and 13, pressure regulating valve 21 and regulatable valve 81 are combined into a flow regulating device 181. With an otherwise identical construction, this offers the possibility of achieving a suitable operating behaviour of the apparatus, even if there is no additional regulatable valve for slow travel or for parking. Apart from saving a pressure regulating valve, this offers the additional advantage that a possibility exists by a varying opening of the valve cross-section within the flow regulating device 181, to damp or remove oscillating movements of vehicle part 2 in a speed-dependent manner, in that the opening of the valve cross-section within the flow regulating device 181 is controlled independently of the vehicle speed values given by tachometer 10. FIG 12 shows the corresponding open valve cross-section of flow regulating device 181, whereas said cross-section is shown closed in FIG. 13, so that then hydraulic liquid can no longer flow through the flow regulating device 181 and joint 3 is blocked.

Figure 14:
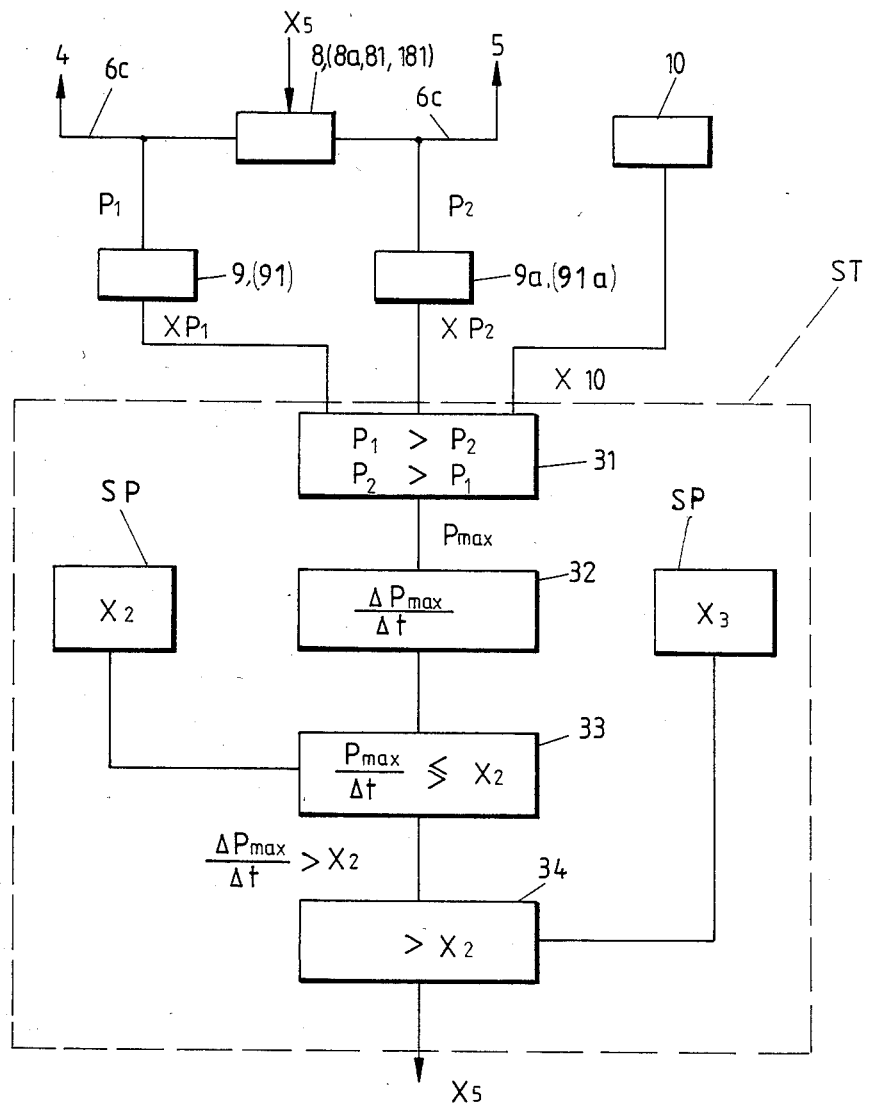
FIGS. 14 and 15 show in a diagramatic manner signal flow diagrams for control means for the embodiments of FIGS. 1 and 9, respectively.
Figure 15:
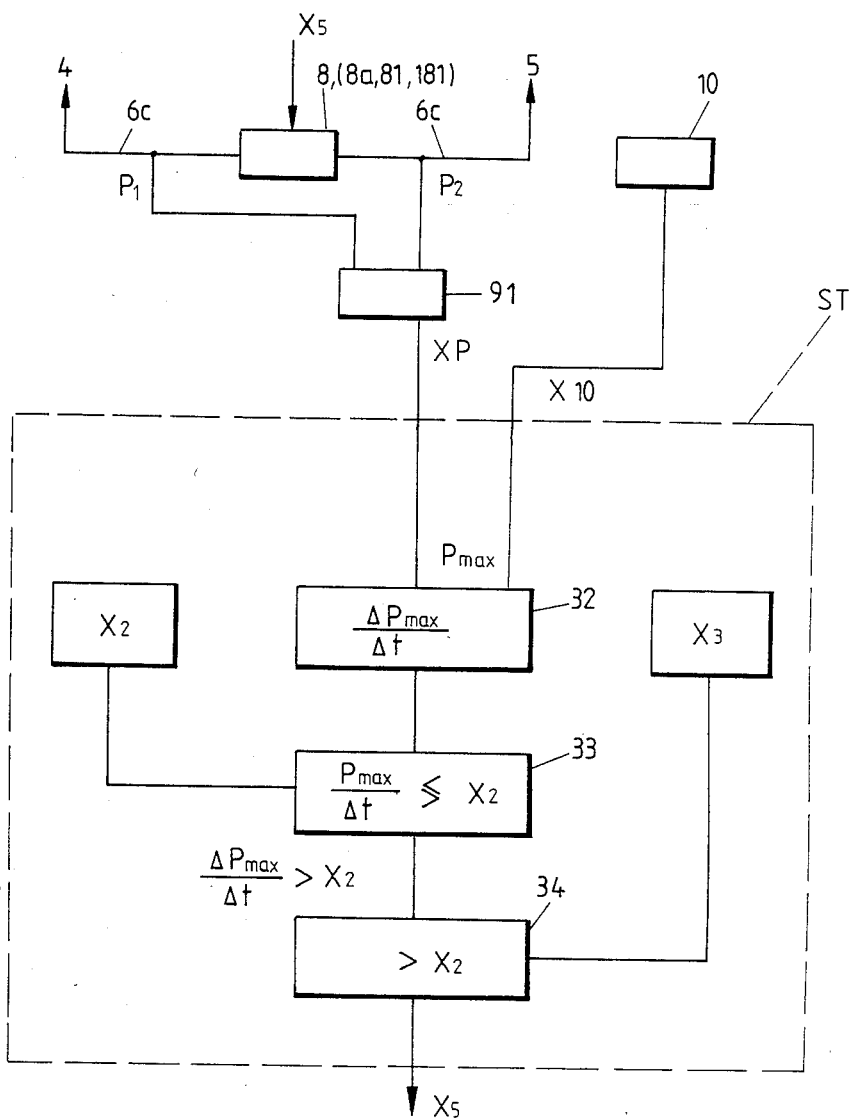

FIGS. 14 and 15 show in diagrammatic and exemplified manner signal flow diagrams for control means ST, FIG. 14 representing the signal flow in control means ST, as required for controlling flow limiting device 150, whilst FIG. 15 shows the signal flow in control means ST, as required for controlling the flow limiting device 350.

The pressures P1 or P2 in connection line 6c, 106c in the vicinity of valve 8, 8b, 81, 181 are recorded by the pressure measuring devices 9, 9a and converted into input values XP1 and XP2. Control means ST records as the input values, the pressure values XP1 and XP2 and an input signal X10 from the tachometer 10. Store SP stores a vehicle-specific, constant value X2, which represents the maximum permitted value for $\Delta P$ max/$\Delta t$. Thus, XX2 is the limit value for the pressure rise per unit of time in connection line 6c which, if exceeded, means a too fast rotary movement in pivot joint 3, so that said joint must be blocked. Store SP can also contain a limit value X3 as an absolute value, corresponding to the maximum permitted joint angle. The joint angle is then determined by measuring sensors (not shown in the drawings) in the pivot joint area or on the hydraulic cylinder units and the measured value is fed to control means ST, so that on reaching the maximum permitted angle pivot joint S3 is blocked. For maintaining the maximum permitted pivot joint angle, it is also possible to provide end stop switches (not shown in the drawings), so that on reaching the maximum permitted jackknifing angle in the pivot joint, said switches supply switching signal S3.

Comparator 31 in control means ST then determines the maximum pressure P max and passes this to computer 32, which relates the pressure rise to time $\Delta t$ and transfers the ratio $\Delta P$ max/$\Delta t$ to a comparator 33. If the ratio $\Delta P$ max/$\Delta t$ exceeds the value X2, of if the pivot joint jackknifing angle reaches a corresponding value and a signal X3 is present, via switch 34, comparator 33 supplies an output signal X5 to valve 8, 8b, 81, 181, which then closes and in this way blocks joint 3. In the case of a corresponding pressure drop in connection line 6c, e.g. when vehicle 1, 2 is moving in a straight line, the reverse operation occurs and joint 3 is released by the opening of valve 8, 8a, 81, 181.

The signal flow according to FIG. 15 corresponds to that of FIG. 14, but the comparator 31 is omitted, because in this case computer 32 is directly connected to a pressure measuring device 91, which measures pressure P1 or P2 in connection line 6c and supplies signal XP as the output signal.

A reversal of the arrangement of the parts forming the jackknifing angle regulating and limiting apparatus on the two vehicle parts 1, 2 of an articulated vehicle is possible. Thus, jackknifing angle regulating and limiting apparatus 100, 200, 300 can also be provided on the rear vehicle part 2, which then carries the flow limiting device 150, 250, 350, which then acts in the same way on the supporting device 140, 240, connected to pivot joint 3.

The invention is not limited to the embodiment described hereinbefore and shown in the drawings, differences in the arrangement and mounting of supporting device 140, 240, together with different constructions of the flow limiting device 150, 250, 350 also fall within the scope of the invention.

What is claimed is:

1. An apparatus for preventing unintentional bending in or jackknifing and for improving the lateral travelling stability under critical road and travelling conditions, arranged to be located in the fulcrum area of an articulated vehicle formed of a front vehicle part and a rear vehicle part connected in articulated manner thereto, with one of the two vehicle parts being motor-driven, and suitable for semi-trailers, articulated buses or vehicles having a towed vehicle part, a supporting device arranged to pivotally connect the two vehicle parts together and including a pivot joint having a pivot axis, wherein the improvement comprises that said supporting device (140) comprises a pair of hydraulic cylinder units (4,5), each said hydraulic cylinder unit (4,5) comprises an elongated casing (42,52) having a first end and a second end and divided by a plunger piston (40,50) into a pair of liquid chambers (4a,4b,5a,5b), a piston rod (41,51) connected to said plunger piston and extending out of the second end of said casing, said casing (42,52) arranged to be articulated at the first end to one of the vehicle parts and said piston rod extending out of the second end of said casing arranged to be articulated to the other one of said vehicle parts at a position spaced from the pivot axis (3a) of said pivot joint (3), so that the connections of said casing (42,52) are located on opposite sides of said pivot axis (3a), connection lines (6a,6b) each interconnecting one liquid chamber (4a,4b,5a,5b) in each of said casings (42,52) so that during horizontal rotary movement of the vehicle parts toward one another, there is always a connection between said chambers increasing in volume and said chambers decreasing in volume corresponding to the movement of the plunger piston, another connection line (6c) interconnecting said connection lines (6a,6b), and a flow limiting device (150) located in said another connection line (6c).

2. An apparatus according to claim 1, wherein the flow limiting device comprises at least one pressure regulating valve, at least one regulatable valve, at least two pressure measuring devices located in said connecting line to which said flow limiting device is connected and arranged one of in front of or behind the regulatable valve, a hydraulic accumulator and a control means.

3. An apparatus according to claim 2, wherein the connection line to which said flow limiting device is connected is provided with two said regulatable valves, and one said regulatable valve separating the hydraulic accumulator from the connection line to which said flow limiting device is connected.

4. An apparatus according to claim 2, wherein the connection line to which said flow limiting device is connected is provided with a second regulatable valve parallel to said regulatable valve.

5. An apparatus according to claim 2, wherein a tachometer is connected to the control means.

6. An apparatus according to claim 2, wherein the control means comrises an electronically controlled programme switch mechanism having a comparator, a computer, a further comparator, a valve operating switch and a desired value store.

7. An apparatus according to claim 1, wherein the flow limiting device connected to said connecting line, having in a section of said connecting line two check valves blocking flow in opposite flow directions and a supply line located between said check valves, said check valves are connected with the connecting line in front of and behind said section by means of other supply lines, corresponding blocking check valves are provided in said other supply lines, and a pressure measuring switch, a pressure regulating valve, a regulatable valve and a hydraulic accumulator are located in said connecting line before flow therethrough enters said section.

8. An apparatus according to claim 7, wherein the supply line is connected via another line to the section of the connection line in the opening area of the supply line and which has in the flow path thereof a correspondingly arranged check valve and a regulatable valve.

9. An apparatus according to claim 1, wherein the pressure regulating valve and the regulatable valve are combined as a flow regulating device.

10. An apparatus according to claim 1, wherein the flow limiting device connected to said connection line comprises a section having two check valves blocking flow in opposite flow directions and two pressure measuring devices, a supply line connected to said connecting line between said pressure measuring valve in front of and behind said section, said supply lines containing corresponding blocking check valves, and said supply lines before issuing into said section, have in the flow path thereof a pressure regulating valve, a regulatable valve and a hydraulic accumulator.

11. An apparatus according to claim 10, wherein the supply line is connected via another line to the section of the connection line in the opening area of the supply line and which has in the flow path thereof a correspondingly arranged check valve and a regulatable valve.

12. An apparatus according to claim 1, wherein the pivot joint comprises a stationary mounting ring fixed to the first vehicle part, an inner rim freely rotatably mounted in said mounting ring, a yoke plate with said inner rim fixed thereto, and members arranged for detachably connecting said yoke plate to the second vehicle part.

* * * * *